(No Model.) 2 Sheets—Sheet 1.

I. R. TITUS & H. C. BOSSINGER.
CAR COUPLING.

No. 308,014. Patented Nov. 11, 1884.

WITNESSES
Phil C. Dieterich
W. A. Keyworth

INVENTORS
Ira R. Titus
Henry C. Bossinger
by J. H. Alexander
ATTORNEY

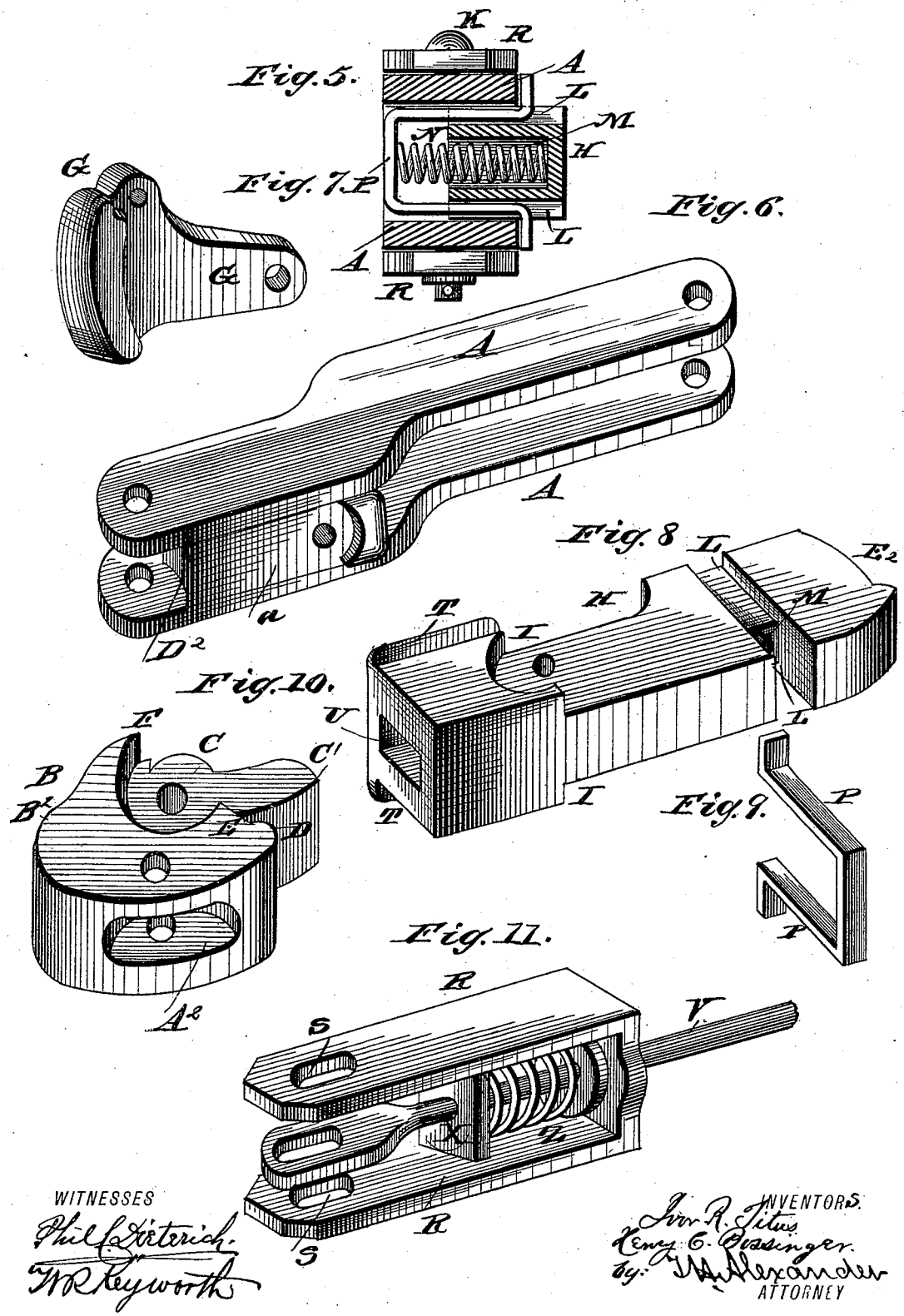

UNITED STATES PATENT OFFICE.

IVOR R. TITUS AND HENRY C. BOSSINGER, OF HUNTINGTON, W. VA.

CAR-COUPLING.

SPECIFICATION forming part of Letters Patent No. 308,014, dated November 11, 1884.

Application filed August 18, 1884. (No model.)

*To all whom it may concern:*

Be it known that we, IVOR R. TITUS and HENRY C. BOSSINGER, of Huntington, in the county of Cabel and State of West Virginia, have invented certain new and useful Improvements in Car-Couplers; and we do hereby declare that the following is a full, clear, and exact description thereof, reference being had to the accompanying drawings, and to the letters of reference marked thereon, which form part of this specification.

This invention relates to certain improvements in car-couplers, and it is an improvement upon the invention for which Letters Patent were granted to us on the 12th day of December 1876, No. 185,269.

The invention has for its objects to simplify the construction of the parts and render the same more durable and compact; also to provide certain improvements in the buffing mechanism, and to construct the draft attachment in such manner that the whole may be compactly combined in the draw-bar, as more fully hereinafter specified. These objects we attain by the means illustrated in the accompanying drawings, in which—

Figure 1:
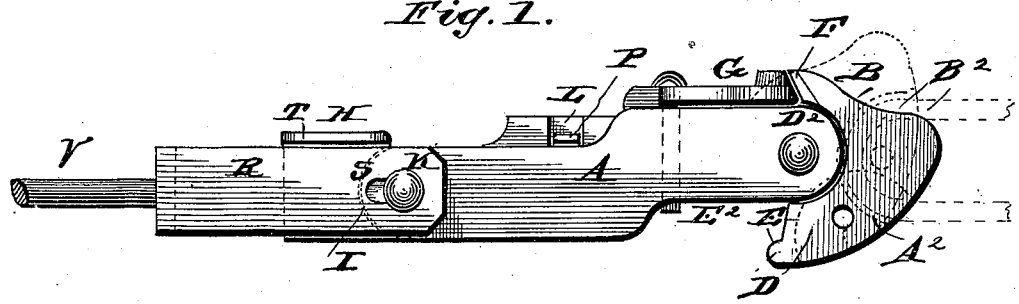
Figure 2:
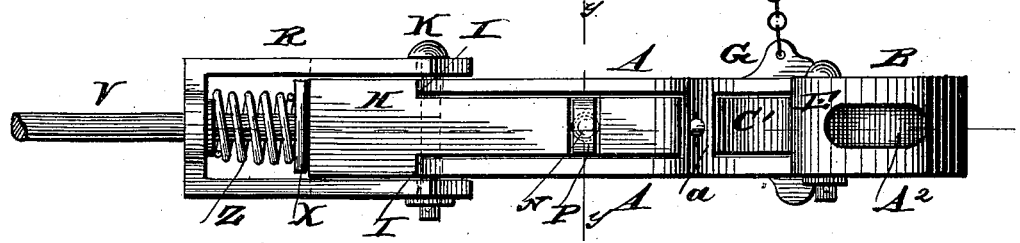
Figure 3:
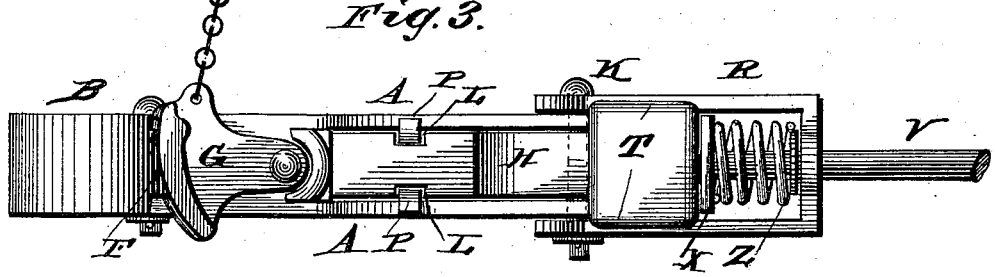
Figure 4:
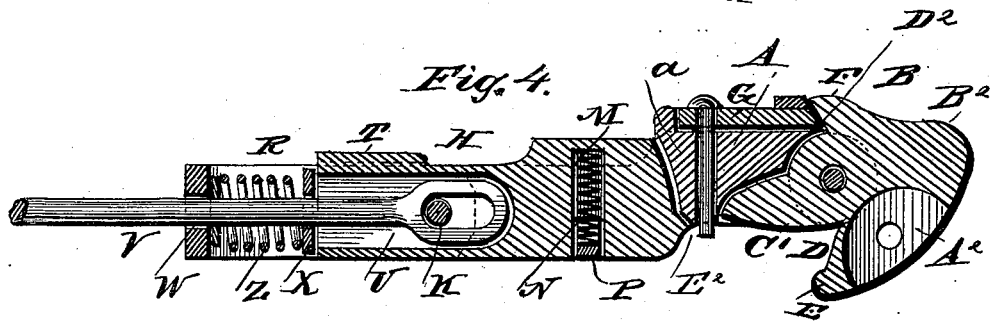

Figure 1 represents a top view of one of the draw-bars, showing our invention; Fig. 2, a face elevation of the same; Fig. 3, an elevation taken on the opposite side to that shown in Fig. 2; Fig. 4, a horizontal longitudinal section of one of the draw-bars, showing our invention; Fig. 5, a transverse vertical section taken on the line *y y* of Fig. 2; Fig. 6, a detached perspective view of the forward portion of the drawbar; Fig. 7, a detached perspective view of the device for locking the coupling-head at the forward end of the draw-bar; Fig. 8, a detached view of the rear portion of the draw-bar; Fig. 9, a detached view of the frame which forms a bearing for the spring which actuates the two portions of the draw-bar, to keep the same in normal position and allow the forward part to move laterally, so as to cause the couplings to properly engage each other. Fig. 10 is a perspective view of the draw-head; Fig. 11, a perspective view of the buffing attachment detached.

In the drawings, the letter A indicates the forward part of the draw-bar forming part of our improved coupler, which is bifurcated at each end, the parts being united by a solid connection, *a*. Near the forward end of the part A of the draw-bar it is bent, as shown, to allow the hooks to properly engage each other when they come together, as more fully hereinafter described. The forward extremities of the portion A are rounded, and between them is pivoted the head B, which is recessed on each side, as indicated by the letter C, and is provided with an extension, C', which works between the forward bifurcated end of the portion A of the draw-bar, as and for the purpose more fully hereinafter specified. The head is provided with a hook, D, at one side, having a lip, E, at its edge, to prevent slipping or being disengaged when the heads of the opposite cars are engaged. On the opposite side the head is provided with a shoulder, F, which is held and engages by the cam G when the head is thrown into position to cause its hook to engage the hook of the opposite head, as more fully hereinafter specified. The shoulder and engaging-cam are beveled at their edges, the shoulder oversetting the edge of the cam when the same is down, so that the two will be held in place. The edge of the cam is slightly eccentric, and the shoulder is shaped to correspond, to hold the cam and prevent it from dropping below said shoulder.

The letter H indicates the rear portion of the draw-bar, which is shouldered at I, and pivoted to the rear of the front portion, A, in the space formed by the bifurcation, by means of a pin, K. The said rear portion, H, is grooved on the top and bottom, as indicated by the letter L, and is provided with a horizontal recess, M, extending from the side groove into the body of said rear portion, and in said recess is placed a spiral spring, N, the outer end of which bears against a stirrup, P, which sets loosely in the grooves, and is bent at its extremities, so as to engage and be held by the edges of the portion A of the draw-bar, for the purpose hereinafter described.

The letter R indicates a stirrup which embraces the rear of the forward and rear portions of the draw-bar. The forward ends of said stirrup are slotted longitudinally, as indicated by the letter S, and are secured to the said bar by the pin K, before mentioned. The rear of the portion H at one side is formed with flanges T, which set against the edges of the stirrup R and limit the lateral movements of the draw-bar and stirrup with respect to each other. The rear end of the rear portion of the draw-bar is recessed longitudinally, as indicated by the letter U, for the reception of the head of the bolt V, by which the draw-bar is attached to the body of the car, the said bolt passing backward through an opening, W, in the rear of the stirrup R. The said bolt also passes through a follower, X, abutting against the rear end of the draw-bar, and is arranged to play loosely in said follower when buffing, but when drawing is checked by the head and shoulders of the bolt.

The letter Z indicates a spiral spring surrounding the bolt and bearing against the rear of the follower before mentioned, which holds the draw-bar and stirrup normally and permits them to yield to each other when the cars meet and also when starting, so as to prevent the shock consequent upon suddenly meeting or starting. The forward end of the pivoted head is provided with an opening for the reception of the link of an approaching car, and apertures for the coupling-pin, in order to permit the coupler to be used with the ordinary coupling link and pin when necessary.

Instead of coiled spring and stirrup for holding the parts of the draw-bar in normal position, a leaf or other spring suitably arranged may be employed, and, if desired, the head of the connecting-bolt, which is secured to the rear of the coupler, may be slotted, as shown in Fig. 11, and connected by means of the pin. The swinging head is formed with a pocket, $A^2$, and a shoulder, $B^2$, at such an angle that, when the pocket is thrown forward, it will be in position to receive the link of an ordinary coupler, and secured by means of an ordinary coupling-pin. The connecting portion of the forward part of the draw-bar is provided with a seat, $D^2$, against which the extension of the swinging head rests when thrown back, to limit its backward movement, and the rear portion of the draw-bar at one side is formed with an offset, $E^2$, which sets against the timbers of the car at one side, so as to give a proper clearance, to permit the forward portion of the draw-bar to move laterally together when the couplers come together in coupling.

The operation of our invention is as follows: When the parts are in normal position, the heads are located in position shown in dotted lines in Fig. 1 of the drawings, and the locking-cam is in an elevated position. When the cars meet, the heads of the respective couplers strike each other, turning the said heads so as to cause the respective hooks to engage each other and couple the cars, the cams dropping automatically and locking the heads. At the same time the forward parts, A, of the respective draw-bars are pressed laterally away from each other, so as to permit the hook of the heads to pass and engage each other, and fall longitudinally directly in the line of draft.

By means of the extension on the heads provision is made for coupling the cars on a curve, where the heads would not strike squarely together, the said extension in this case abutting and shifting the heads.

The locking-cam may be unlocked to uncouple the car by lifting it by hand, or by means of a lever or other mechanism operated from the top of the car.

The forward end of the rear portion of the draw-bar is provided with a shoulder, C, which abuts against the solid portion connecting the bifurcated parts before mentioned; or a stop may be secured to the side or other part of the said rear portion, in order to limit the movement and prevent the parts from being pressed too far from each other by the spring.

Having described our invention, what we claim as new, and desire to secure by Letters Patent, is—

1. The combination, with the forward end of the draw-bar, of the laterally-swinging head having a hook at one side and a curved inwardly-beveled shoulder at the other, and a pivoted cam having an outwardly-beveled edge adapted to swing vertically and automatically to engage the shoulder and lock the head, substantially as specified.

2. The combination, with the forward end of the draw-bar, of the laterally-swinging head having a hook at one side provided with a lip projection or flange, and a curved inwardly-beveled shoulder at the other, and a pivoted cam having an outwardly-beveled edge adapted to swing vertically and automatically to engage the shoulder and lock the head, substantially as specified.

3. The combination, with the forward portion of the draw-bar, of the rear portion pivoted thereto, the stirrup having bent ends bearing against the edges of said rear portion, and the spring setting in a recess in said rear portion, the said rear portion being grooved, as described, for the stirrup, whereby the forward and rear parts of the stirrup are permitted to play laterally, substantially as and for the purpose specified.

4. The combination, with the draw-bar, of the stirrup embracing the rear of the same, having its end slotted and secured to the said draw-bar by a bolt, of the longitudinal bolt passing through the rear of the stirrup and into a recess in the rear of the draw-bar, where it is loosely secured, and the spring surrounding the said bolt and bearing against a follower at the rear of the draw-bar, whereby the draw-bar and stirrup will give to each other upon coupling or starting and stopping to avoid the shock consequent thereon, substantially as specified.

5. The combination, with the forward and rear portions of the draw-bar, pivoted together, as described, of the slotted stirrup pivoted to the pivotal pin of said portions, the connecting-bolt, and spring, the whole adapted to operate substantially as described.

6. The combination, with the front and rear portions of the draw-bar and the stirrup, of the flanges at the rear of said rear portion of the draw-bar, whereby the movements of the draw-bar and stirrup are limited, substantially as specified.

7. The combination, with the draw-bar recessed at its rear end, and the stirrup pivoted thereto, of the connecting-bolt having a slotted head, through which the connecting-pin of the forward and rear portions of the draw-bar passes, substantially as specified.

8. The combination, with the front portion of the draw-bar, its movable hooked head, and locking device, of the pivoted rear portion, and spring for holding the parts normally, and the stirrup and connecting-bolt and spring, the whole arranged to operate substantially as specified.

9. The combination, with the draw-bar, of the movable head having a beveled shoulder, and the locking-cam having a beveled edge, which is curved eccentrically and adapted to engage the shoulder to hold the head, substantially as specified.

10. The combination, with the bifurcated end of the draw-bar, of the head provided with a shoulder constructed to be parallel with the side of the draw-bar when the head is thrown forward, so as to set the pocket to receive an ordinary coupling-link when desired, substantially as specified.

In testimony that we claim the foregoing as our own we affix our signatures in presence of two witnesses.

IVOR R. TITUS.
HENRY C. BOSSINGER.

Witnesses:
T. H. ALEXANDER,
M. P. CALLAN.